UNITED STATES PATENT OFFICE.

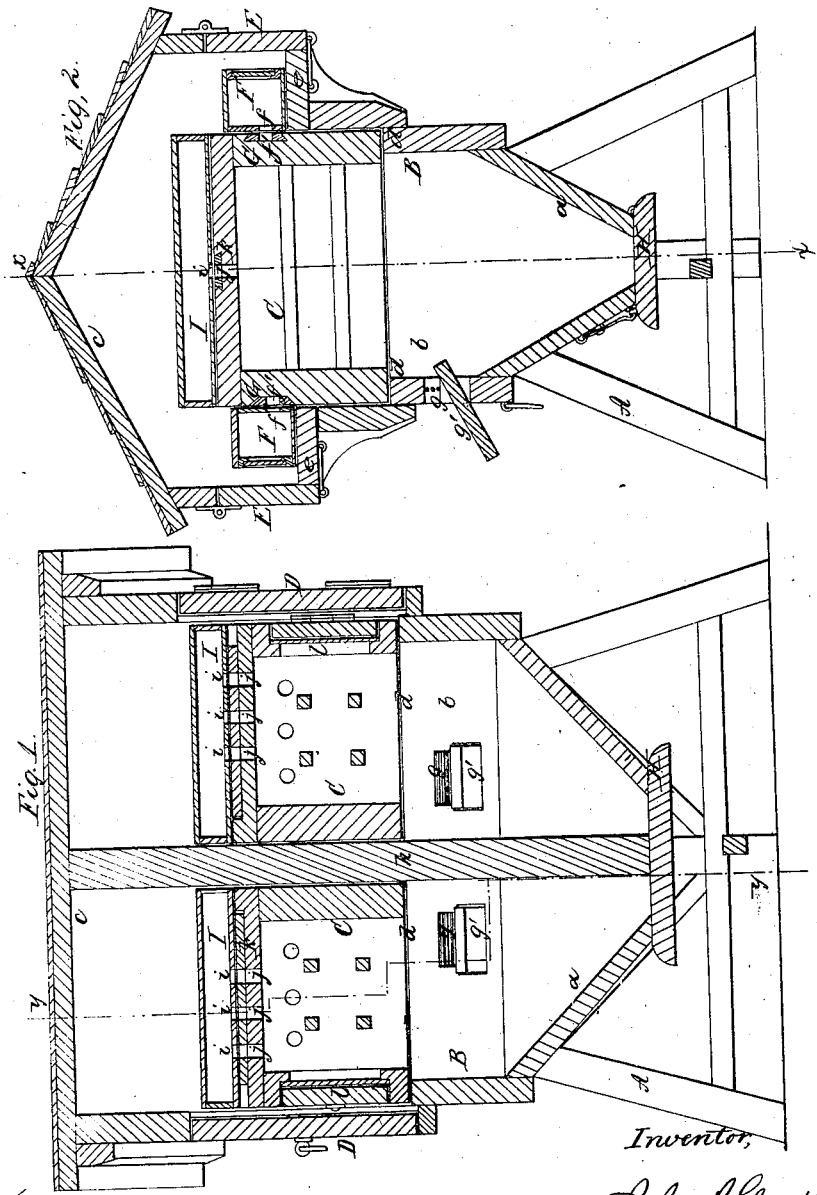

JOHN A. GRUVER, OF WEST UNION, IOWA.

IMPROVEMENT IN BEE-HIVES.

Specification forming part of Letters Patent No. 39,142, dated July 7, 1863.

*To all whom it may concern:*

Be it known that I, JOHN A. GRUVER, of West Union, in the county of Fayette and State of Iowa, have invented a new and Improved Bee-House or Bee-Palace; and I do hereby declare that the following is a full, clear, and exact description of the same, reference being had to the accompanying drawings, making a part of this specification, in which—

Figure 1 is a vertical section of my invention, taken in the line $x\ x$, Fig. 2; Fig. 2, a vertical section of the same, taken in the line $y\ y$, Fig. 1.

Similar letters of reference indicate corresponding parts in the two figures.

The object of this invention is to construct a bee-house or bee-palace in such a manner that the hives can be removed with the greatest facility for the purpose of hiving swarms, and then readily inserted in the house or palace, the house or palace also serving as a thorough protection for the bees, both against cold in winter and heat in summer, and admitting of spare-honey boxes being readily applied to the hives and removed therefrom.

To enable those skilled in the art to fully understand and construct my invention, I will proceed to describe it.

A represents a framing, which supports a house, B, the lower part, $a$, of which is of inverted pyramidal form, the part $b$ above $a$ being of rectangular form and covered by a double-pitch roof, $c$. The rectangular part $b$ of the hive has a horizontal ledge, $d$, extending all around within it, and these ledges serve as supports for the hives C C, which are inserted into the house through doors D at its end.

At each side of the upper part, $b$, of the house there is a flap or door, E, and these doors when down or closed cover horizontal shelves $e\ e$, on which spare-honey boxes F are placed, said boxes being at the sides of the hives and having holes $f$ made in them at the side adjoining the hives, which holes correspond in position or register with the holes $f$, made in the hives to afford a communication between said boxes and the hives, the communication being cut off at any time by means of perforated slides G, inserted in dovetail grooves in the hives. These spare-honey boxes may be adjusted to the hives and removed therefrom at any time when necessary by raising the flaps or doors E. The hives themselves also may be removed with equal facility by opening the doors D. The bee-entrances $g$ are in one side of the lower part, $a$, of the bee-house, each entrance having an inclined board, $g$, fitted in it to aid the bees in entering and passing out of the hives. The house B is divided into two equal compartments by a vertical central partition, $h$. Each hive therefore, it will be seen, is fitted within a compartment of its own, there being no communication between them. The lower end of the part $a$ of the house B has an opening in it, which is covered by a flap, H, which may be lowered or opened at any time to admit of dirt and filth escaping from the hives. The inverted pyramidal form of $a$ causes the dirt and filth to readily escape from the hives and house. On the top of each hive there is also a spare-honey box, I, and these boxes are provided with openings $i$, which register with openings $j$ in the top of the hives $a$, perforated slide $k$ being in the top of each hive to cut off the communication when necessary. These boxes I are removed by opening the doors D.

The framing A may be constructed in any proper manner to support the house B, and the roof $c$ may be of shingles. The bottoms of the hives C C are open, and each hive is provided with a door, $l$, to render the honey-combs accessible.

The whole arrangement is extremely simple and efficient, may be constructed at a moderate cost, and the hives and spare-honey boxes may be removed and replaced and manipulated generally as required in bee-culture without annoying the bees.

Having thus described my invention, what I claim as new, and desire to secure by Letters Patent, is—

A bee-house or bee-palace provided at its sides with horizontal shelves $e\ e$ and flaps or doors E, to receive the spare-honey boxes I, and also provided with horizontal internal ledges, $d$, to support the hives, a door, D, at each end, and an inverted pyramidal lower part, $a$, with a flap, H, the house or palace being supported by a suitable framing, A, all constructed and arranged as and for the purpose set forth.

JOHN A. GRUVER.

Witnesses:
 GEO. L. NOBLE,
 P. F. CRANE.